United States Patent [19]

Urban et al.

[11] Patent Number: 4,916,749
[45] Date of Patent: Apr. 10, 1990

[54] ELASTOMERIC BUSHING AND METHOD OF MANUFACTURING THE SAME

[75] Inventors: Henry F. Urban, Sandusky; Jay W. Thornhill, Huron, both of Ohio

[73] Assignee: The Pullman Company, Princeton, N.J.

[21] Appl. No.: 341,002

[22] Filed: Apr. 20, 1989

[51] Int. Cl.$^4$ ............................................. F16C 27/06
[52] U.S. Cl. .................................... 384/298; 384/138; 384/125
[58] Field of Search ............... 384/125, 138, 298, 300, 384/297, 147

[56] References Cited

U.S. PATENT DOCUMENTS

| | | |
|---|---|---|
| 1,512,190 | 10/1924 | Barnes . |
| 1,923,514 | 8/1933 | Stockfleth . |
| 2,067,034 | 1/1937 | Whiteley . |
| 2,631,905 | 3/1953 | Coppen . |
| 3,097,893 | 7/1963 | White . |
| 3,110,530 | 11/1963 | Herman ............................ 384/298 |
| 3,133,769 | 5/1964 | Drake . |
| 3,300,257 | 1/1967 | Selker et al. . |
| 4,105,267 | 8/1978 | Mori . |
| 4,671,676 | 6/1987 | Chen et al. . |

Primary Examiner—Lenard A. Footland
Attorney, Agent, or Firm—Russell E. Baumann

[57] ABSTRACT

A bushing for rotatably supporting a bar-shaped suspension link comprises an elastomeric body having a central axis and including an axial bore adapted to receive the suspension link therethrough. The bore includes a circumferential surface having projected surface portions and recessed surface portions, the projected surface portions projecting radially inwardly to provide radial clearance between the suspension link and the recessed surface portions. Preferably, the projected surface portions include a plurality of first and second ridges projecting radially inwardly. The first ridges are substantially parallel to the central axis of the elastomeric body and intersect the second ridges at substantially right angles to define therebetween the recessed surface portions. The preferred embodiment of the bushing of this invention further comprises a double-knit fabric liner covering the circumferential surface of the bore of the body. The fabric liner preferably is woven from fibers of polyester and polytetrafluoroethylene and conforms to the contour of the projected and recessed surface portions of the axial bore. In addition, a method of manufacturing the suspension bushing is disclosed.

14 Claims, 1 Drawing Sheet

ELASTOMERIC BUSHING AND METHOD OF MANUFACTURING THE SAME

BACKGROUND OF THE INVENTION

1. Field of the Invention

The present invention relates to elastomeric bushings. In particular, the present invention relates to elastomeric bushings used in motor vehicle suspension systems.

2. Description of the Related Art

Conventional motor vehicle suspension systems often include one or more stabilizer bars to control the degree of roll of the motor vehicle when it negotiates a curve. A typical stabilizer bar is generally C-shaped, having a relatively long intermediate portion disposed laterally with respect to the motor vehicle and a pair of relatively short end portions extending either forwardly or rearwardly to connect a corresponding pair of wheel hubs. The intermediate portion normally is connected to the underside of the vehicle body by a bracket.

The mounting bracket for the intermediate portion of the stabilizer bar typically includes an elastomeric bushing, sometimes termed an insulator, that contacts and supports the stabilizer bar. In most applications it is desirable to use a bushing that permits the stabilizer bar to rotate freely about the axis of the intermediate portion as the wheel hubs travel vertically relative to the vehicle body. Where free rotation is desirable, it is important to minimize friction between the stabilizer bar and the bushing to reduce noise and wear.

Previous efforts to minimize friction at the bushing-stabilizer bar interface have employed low-friction materials as liners covering the bore of the bushing and/or have added lubricants between the bushing and stabilizer bar. Commonly used materials for bushing liners are polyester and polytetrafluoroethylene. Silicone-based grease often is used as a lubricant.

Although conventional stabilizer bar mounting schemes usually are adequate when a motor vehicle is new, performance can deteriorate quickly after exposure to normal road conditions. A particular problem with conventional systems is that dirt, road salt, and other contaminants become lodged between the bushing and the intermediate portion of the stabilizer bar, creating an audible noise when the bar rotates. Many drivers find this noise objectionable.

The present invention is intended to provide an elastomeric suspension bushing that will not produce objectionable noise, even after exposed to dirt, road salt, and other contaminants.

The present invention also is intended to provide a method of manufacturing a noise-suppressing suspension bushing.

Additional advantages of the present invention will be set forth in part in the description that follows, and in part will be obvious from that description or can be learned by practice of the invention. The advantages of the invention can be realized and obtained by the apparatus particularly pointed out in the appended claims.

SUMMARY OF THE INVENTION

The present invention overcomes the problems of prior art elastomeric suspension bushings by providing the surface of the bushing's bore with a plurality of ridges that form recesses therebetween. Noise-producing contaminants move to the recesses and away from the surface of the supported suspension member as the member rotates.

To overcome the problems of the prior art suspension bushings, and in accordance with the purpose of the invention as embodied and broadly described herein, the bushing of the present invention for rotatably supporting a bar-shaped suspension link comprises an elastomeric body having a central axis and including an axial bore adapted to receive the suspension link therethrough. The bore includes a circumferential surface having projected surface portions and recessed surface portions, the projected surface portions projecting radially inwardly to provide radial clearance between the suspension link and the recessed surface portions.

In a preferred embodiment of the invention, the projected surface portions include a plurality of first and second ridges projecting radially inwardly. The first ridges are substantially parallel to the central axis of the elastomeric body and intersect the second ridges at substantially right angles to define therebetween the recessed surface portions. The preferred embodiment of the bushing of this invention further comprises a double-knit fabric liner covering the circumferential surface of the axial bore. The fabric liner conforms to the contour of the circumferential surface and preferably is woven from fibers of polyester and polytetrafluoroethlyne.

Broadly, the method of this invention for manufacturing a suspension bushing comprises the steps of providing a generally cylindrical mandrel having a plurality of intersecting first and second grooves on the circumferential surface thereof, covering the circumferential surface of the mandrel with a fabric liner, and casting an elastomeric body around the mandrel.

The accompanying drawings, which are incorporated in and which constitute a part of this specification, illustrate at least one embodiment of the invention and, together with the description, explain the principles of the invention.

DESCRIPTION OF THE PREFERRED EMBODIMENT

Reference will be made in detail to the presently preferred embodiment of the invention, an example of which is illustrated in the accompanying drawings.

Figure 1:
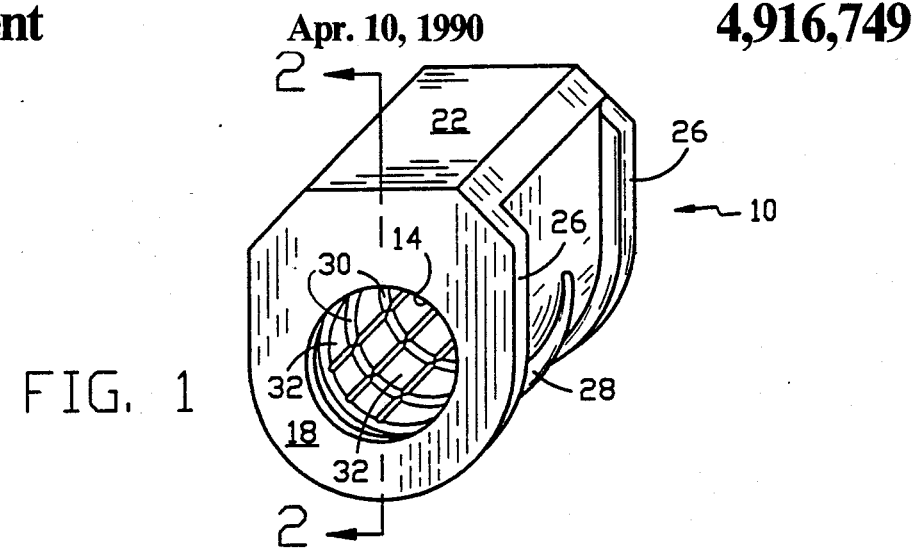
FIG. 1 is a perspective view of the suspension bushing of the present invention.
Figure 2:
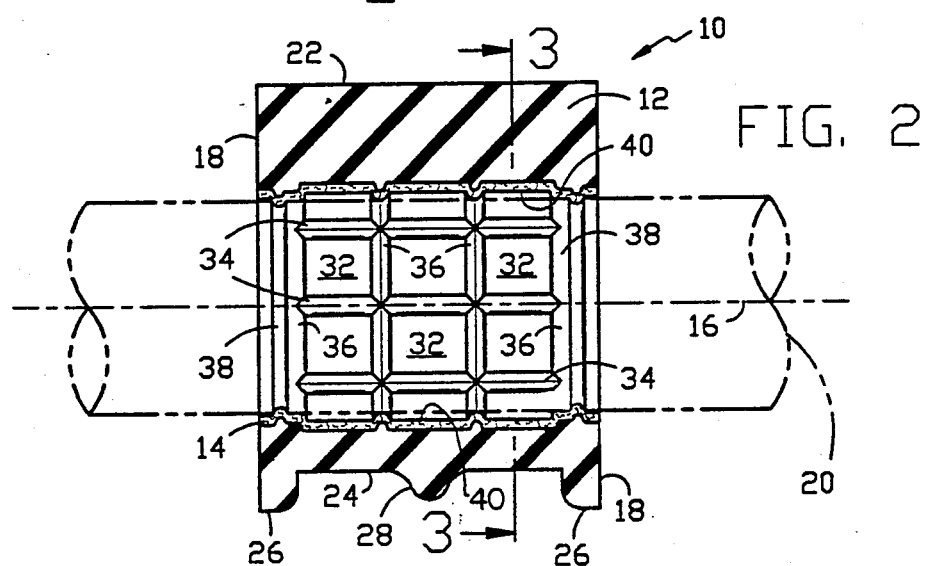
FIG. 2 is a cross-sectional view of the suspension bushing of the present invention taken along line 2—2 of FIG. 1.
Figure 3:
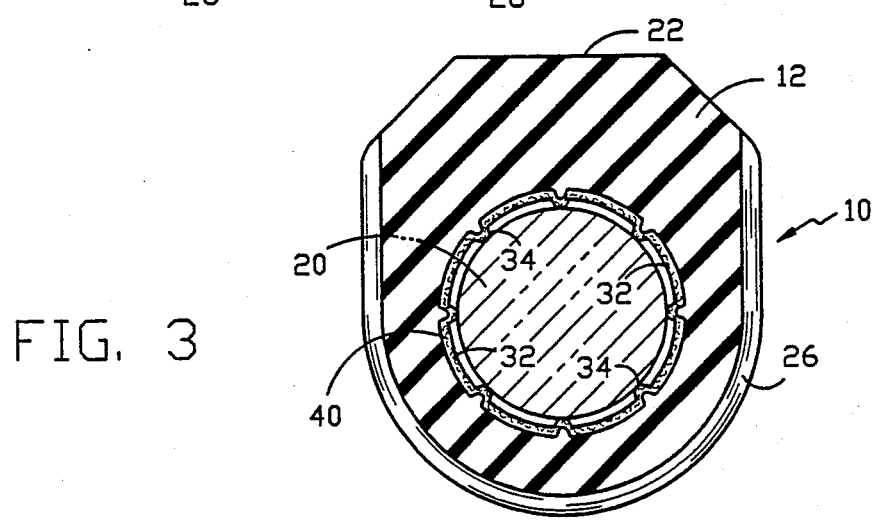
FIG. 3 is a cross-sectional view of the suspension bushing of the present invention taken along line 3—3 of FIG. 2.

The present invention will be described with reference to an elastomeric bushing, an embodiment of which is shown in FIGS. 1-3, used to rotatably support the intermediate portion of a stabilizer bar on the underside of a motor vehicle body. As will be apparent to one of ordinary skill in the art, the present invention can be adapted to serve a bushing for rotatably supporting various types of suspension links.

The elastomeric bushing of this invention, designated generally by reference numeral 10 in FIGS. 1-3, includes a body 12 comprised of an elastomeric material, such as natural rubber or butyl rubber. Extending through elastomeric body 12 is bore 14, which is disposed along central axis 16. Elastomeric body 12 further includes opposed axial end faces 18.

Bushing 10 is intended to rotatably support a bar-shaped suspension link 20 (shown with phantom lines in FIGS. 2 and 3), which is received in axial bore 14. In the presently preferred embodiment of bushing 10, where suspension link 20 is the intermediate portion of a stabilizer bar, bushing 10 preferably is secured to the underside of a motor vehicle body with mounting surface 22 contracting the vehicle body. A mounting bracket (not shown) engages bracket surface 24 disposed between flanges 26 and is secured to the motor vehicle. Bracket surface 24 preferably includes circumferential rib 28 to assist in providing uniform compression of the elastomeric material between the mounting bracket and the stabilizer bar.

In accordance with the invention, the circumferential surface of axial bore 14 includes projected surface portions 30 and recessed surface portions 32. Projected surface portions 30 project radially inwardly to contact the suspension link and to provide clearance between the suspension link received in axial bore 14 and recessed surface portions 32.

In the preferred embodiments shown in FIGS. 1–3, projected surface portions 30 include first ridges 34 and second ridges 36. First ridges 34 intersect second ridges 36 to define therebetween recessed surface portions 32. Typically, these ridges extend inwardly up to 2 millimeters from the recessed surface portions and occupy no more than fifty percent of the bar contact area when assembled. First ridges 34 preferably are substantially parallel to central axis 16 and intersect second ridges 36 at substantially right angles to produce a waffle-shaped surface contour. It will be appreciated by those skilled in the art that alternative ridge patterns can be employed. For example, the circumferential surface of axial bore 14 can be provided with intersecting ridges that form diamond, chevron, or radial spline patterns. In addition, a pattern combining axial first ridges and helical second ridges can be employed.

Bushing 10 exhibits substantially reduced noise in comparison to conventional stabilizer bar bushings, which have smooth essentially cylindrical bores. As shown by test data, these enhanced noise characteristics of the bushing of this invention are due to the provision of a radial clearance between suspension link 20 and recessed surface portions 32. The bushing of the present invention is capable of holding relatively large amounts of contamination within these radial clearances.

In conventional stabilizer bar bushings, dirt, road salt, and other contaminants become lodged in the circumferential surface of the bore resulting in noise producing sliding friction between the lodged contaminants and the surface of the stabilizer bar. With the suspension bushing of the present invention, contaminants migrate to the clearances between recessed surface portions 32 and suspension link 20, where they are either lodged in recessed surface portions 32 in a spaced relationship with suspension link 20 or can move freely within the clearance without becoming lodged in a frictional relationship with suspension link 20. If desired, a lubricant can be provided between bushing 10 and suspension link 20 to assist in reducing friction and entraining contaminants. Circumferential lips 38, preferably provided at each axial end of bore 14, provide a sealing function that limits loss of lubricant and the entrance of contaminants. These lips are designed to project inwardly a greater amount than projected surface portions (typically 0.5 to 1.5 millimeters).

In accordance with the invention, axial bore 14 preferably is covered with a fabric liner 40 (knit/woven) conforming to the contour of the projected and recessed surface portions of bore 14. Use of fabric liner 40 has been found to provide additional reduction of friction and noise under normal service conditions. Fabric liner 40 preferably is a double knit fabric that is woven from fibers of polyester and polytetrafluoroethylene (PTFE). The fabric preferably is woven so that the outer surface contacting elastomeric body 12 is comprised largely of polyester fibers and the inner surface contacting suspension link 20 is comprised largely of PTFE fibers. Alternatively, bushing 10 can be provided with a fabric liner 40 of polyester having its radially inward surface coated with a friction—reducing material such as PTFE by, for example, spray bonding.

A method of manufacturing the suspension bushing of the present invention will now be described.

In manufacturing bushing 10, the first step is providing a cylindrical mandrel, preferably steel, that has been machined to produce an outer circumferential surface that is the negative of the desired circumferential surface of axial bore 14. When manufacturing a bushing having the waffle-shaped pattern shown in FIGS. 1–3, the outer circumferential surface of the mandrel is provided with a corresponding waffle pattern comprising a plurality of orthogonally intersecting first and second grooves.

In accordance with the method of this invention, the circumferential surface of the mandrel is covered with fabric liner 40, preferably a double-knit polyester-PTFE fabric having its mandrel-contacting surface comprised largely of PTFE fibers. The fabric liner preferably is seamless and exhibits minimal "bleed through" when contacted with molten rubber. After the mandrel is covered with the fabric liner, the elastomeric body is cast around the mandrel. The elastomeric material, preferably natural rubber or butyl rubber, forces the fabric liner to assume the contour of the mandrel to achieve the desired contouring of the projected and recessed surface portions of the bushing. If desirable, a friction-reducing material such as PTFE can be spray bonded to the circumferential surface of the resulting axial bore 14 after casting.

In the presently preferred embodiments of stabilizer bar bushing 10, when used with a stabilizer bar having a nominal diameter of 28.6 mm, the diameter of bore 14 preferably is about 28.5 mm when measured between projected surface portions 30 and about 31.0 mm when measured between recessed surface portions 32. As will be apparent to those of ordinary skill in the art, the radial height of projected surface portions 30 can be varied depending upon the load conditions required.

It will be apparent to those skilled in the art that modifications and variations can be made in the apparatus of the invention without departing from the scope of the invention. For example, elastomeric materials other than natural rubber or butyl rubber can be used to provide a bushing with the particular resiliency characteristics of such alternative materials. In addition, bushings can be used without a fabric liner. Furthermore, the elastomeric body can be composed of two different elastomeric materials, one immediately surrounding the axial bore and the other comprising the bulk of the body. The material surrounding the bore can be selected to provide particular friction, wear, and resiliency properties appropriate for the conditions occurring at the bushing-suspension link interface, as well as to enhance compatibility with a fabric liner if one is used. The overall resiliency of the bushing will be governed by the material comprising bulk of the body. The invention in its broader aspects is, therefore, not limited to the specific details and illustrated examples shown and described. Accordingly, it is intended that the present invention cover such modifications and variations provided that they fall within the scope of the appended claims and their equivalents.

What is claimed is:

1. A bushing for rotatably supporting a bar-shaped suspension link, the bushing comprising an elastomeric body having a central axis and including an axial bore adapted to receive the suspension link therethrough in direct sliding relationship, said bore including a circumferential surface covered with a low friction fabric liner, said low friction liner conforming to the contour of said circumferential surface, said circumferential surface having projected surface portions and recessed surface portions, said projected surface portions projecting radially inwardly to provide a radial clearance between the suspension link and said recessed surface portions to provide an area for contaminants to collect thus minimizing audible noise occurring between said bushing and said link.

2. The bushing of claim 1, wherein said projected surface portions include a plurality of first and second ridges projecting radially inwardly, said first ridges intersecting said second ridges to define therebetween said recessed surface portions.

3. The bushing of claim 2, further including circumferential sealing lips at each end of the axial bore which project radially inwardly a greater amount then projected surface portions.

4. The bushing of claim 1, wherein said fabric liner is woven from fibers of polyester and polytetrafluoroethylene.

5. The bushing of claim 1, wherein the radially inward surface of said fabric liner is coated with a low-friction material.

6. The bushing of claim 5, wherein said low-friction material is polytetrafluoroethylene.

7. The bushing of claim 1, wherein said fabric liner is a double-knit fabric.

8. A bushing for rotatably supporting a bar-shaped suspension link, the bushing comprising an elastomeric body having a central axis and including an axial bore adapted to receive the suspension link therethrough, said bore including a circumferential surface covered with a double-knit fabric liner woven from fibers of polyester and polytetrafluoroethylene, said fabric liner conforming to the contour of said circumferential surface, said circumferential surface having a plurality of first and second ridges being substantially parallel to said central axis and intersecting said second ridges at substantially right angles to define therebetween a plurality of recessed surface portions, said first and second ridges slidably contacting the suspension link received in said bore and providing radial clearance between the suspension link and said recessed surface portions to provide an area for contaminants to collect thus minimizing audible noise occurring between said bushing and said link.

9. A bushing for rotatably supporting a bar-shaped suspension link, the bushing comprising an elastomeric body having a central axis and including an axial bore adapted to receive the suspension link therethrough, said bore including a circumferential surface covered with a low friction fabric liner, said low friction liner conforming to the contour of said circumferential surface, said circumferential surface having a plurality of first and second ridges projecting radially inwardly, said first ridges intersecting said second ridges to define therebetween a plurality of recessed surface portions, said first and second ridges slidably directly contacting the suspension link received in said bore, occupying no more than fifty percent of the link contact area when assembled to provide radial clearance between the suspension link and said recessed surface portions to provide an area for contaminants to collect thus minimizing audible noise occurring between said bushing and said link.

10. The bushing of claim 9, wherein said fabric liner is a double-knit fabric.

11. The bushing of claim 9, wherein said fabric liner is made from fibers of polyester and polytetrafluoroethylene.

12. The bushing of claim 9, wherein the radially inward surface of said fabric liner is coated with a low-friction material.

13. The bushing of claim 12, wherein said low-friction material is polytetrafluoroethylene.

14. The bushing of claim 9, wherein said first ridges extend parallel to said central axis of said body and said second ridges are substantially orthogonal to said first ridges.

* * * * *